(12) United States Patent
Zargham et al.

(10) Patent No.: US 6,470,398 B1
(45) Date of Patent: Oct. 22, 2002

(54) METHOD AND APPARATUS FOR SUPPORTING A SELECT () SYSTEM CALL AND INTERPROCESS COMMUNICATION IN A FAULT-TOLERANT, SCALABLE DISTRIBUTED COMPUTER ENVIRONMENT

(75) Inventors: Bahman Zargham, Sunnyvale; Jim Uren, San Jose; Robert Shaw, Cupertino; Sylvia Chan, Mountain View; Lars Plum, Milpitas; Minoo Gupta, Los Gatos, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/835,398

(22) Filed: Apr. 7, 1997

Related U.S. Application Data

(60) Provisional application No. 60/024,796, filed on Aug. 21, 1996.

(51) Int. Cl.⁷ .............................. G06F 9/54; G06F 11/30
(52) U.S. Cl. ...................... 709/318; 709/317; 709/202; 710/15
(58) Field of Search .................................. 709/300, 318, 709/202, 317, 330, 237, 232; 710/5, 15, 19, 18, 17, 52

(56) References Cited

U.S. PATENT DOCUMENTS

| | | | | |
|---|---|---|---|---|
| 5,142,622 A | * | 8/1992 | Owens | 709/227 |
| 5,524,211 A | * | 6/1996 | Woods et al. | 709/220 |
| 5,606,705 A | * | 2/1997 | Randall et al. | 709/203 |
| 5,706,516 A | * | 1/1998 | Chang et al. | 709/314 |
| 5,721,825 A | * | 2/1998 | Lawson et al. | 709/203 |
| 5,799,156 A | * | 8/1998 | Hogan et al. | 709/237 |
| 5,905,890 A | * | 5/1999 | Seamon et al. | 717/4 |
| 6,237,035 B1 | * | 5/2001 | Himmel et al. | 709/224 |

FOREIGN PATENT DOCUMENTS

| | | |
|---|---|---|
| EP | 0 360 768 A2 | 3/1990 |
| EP | 0 509 946 A2 | 10/1992 |
| EP | 0 723 236 A2 | 7/1996 |

OTHER PUBLICATIONS

Dannenberg, Roger B. "A Butler Process for Resource Sharing on Spice Machines", Jul. 1985.*
Hall, Martin. "Windows Sockets", Jan. 1993.*
Sidhu, Gursharan S. "Inside Applet Talk", 1990.*
Kaashoek, M. F. "Group Communication in Amoeba and its Applications", Jul. 1993.*
(Stevens). Stevens, Richard W. "UNIX Network Programming", Jan. 1990.*
Handley, M. et al. "SIP: Session Initiation Protocol" Dec. 2, 1996.*
Nielsen, Kjell, et al., *Inter–processor Communication and Ada in Distributed Real–Time Systems*, vol. 13, No. 8, Oct. 1, 1990, pp. 451–459.

* cited by examiner

Primary Examiner—St. John Courtenay, III
Assistant Examiner—Lewis A. Bullock, Jr.
(74) Attorney, Agent, or Firm—Leah Sherry; Oppenheimer, Wolff & Donnelly (57) ABSTRACT

A computing environment (2) includes multiple CPUs (5a–c), multiple nonshared memory spaces and a means for implementing a select system call (10a–c). The connection maintenance system is both fault-tolerant and scalable in that agents (30–33a–c) exist independently in each nonshared memory space to handle interprocess connections between memory

35 Claims, 5 Drawing Sheets

Microfiche Appendix Included
(2 Microfiche, 111 Pages)

METHOD AND APPARATUS FOR SUPPORTING A SELECT () SYSTEM CALL AND INTERPROCESS COMMUNICATION IN A FAULT-TOLERANT, SCALABLE DISTRIBUTED COMPUTER ENVIRONMENT

This application claims the benefit of Provisional application 60/029,796, filed Aug. 21, 1996.

MICROFICHE APPENDIX AND COPYRIGHT NOTICE

This application is being filed with a microfiche appendix consisting of 111 frames on 2 sheets containing source code listings for software components related to the invention. Appendix sections are labeled A, B, D, and E.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention is related to the field of digital circuits and to the field of instructions and program code for the operation thereof. More particularly, the present invention is related to data communication between digital circuits or between processes running on the same circuit. The invention is further related to fault-tolerant and scalable distributed processor and distributed memory digital processing systems.

This discussion of the present invention presupposes some familiarity with computer programming and software, particularly data input and output (I/O), network communications, and interprocess communications. The present invention also presupposes some familiarity with multiprocessor and nonshared memory computer systems, as discussed in co-assigned U.S. Pat. No. 4,228,496, which is incorporated herein by reference to the extent necessary to understand and enable the invention. This discussion of the present invention also presupposes some familiarity with the UNIX and related operating systems and with the well-known sockets protocol for enabling interprocess and network communication.

In all cases, the glossary and specific examples given herein are intended to be illustrative of the invention but not limiting. It will be apparent to anyone of skill in the art that the present invention may be implemented in an unlimited variety of operating system environments. Therefore, the invention should not be limited except as provided in the attached claims.

Background of Select( ) and Sockets( )

In UNIX and other operating systems (OS's), processes use a select( ) (or a similar) system call to inform the OS kernel that they are interested in a particular resource for interprocess communication. A simple example would be a process that needs to wait for a particular resource to have data to read or to be available for a write. Rather than the process using CPU time to repeatedly query the connection to determine if the connection is ready, the process may call select( ) and then become dormant if the connection is not immediately ready. The call to select( ) registers with the OS kernel that the calling process needs to be awakened when the interprocess communication resource becomes ready.

The select( ) OS call may be used by a process having open connections to one or more sockets. A socket is a resource for interprocess communication that is generally used between a user process and a special I/O process handling a network I/O protocol such as the common internet protocols TCP or IP. Sockets are generally implemented as a data structure within the OS memory space, and this memory space is accessible to the OS, the I/O process responsible for delivering data to the socket, and the user process that is communicating via the socket. A socket data structure has associated with it all state information necessary to handle the interprocess communication and generally includes a pointer to a memory location for temporarily storing the actual data packets flowing between the user process and the I/O connection.

Select( ) also may be used on other OS data structures used for interprocess communication such as pipes or FIFOs and for other opened I/O such as ttys, disk opens, and directory opens. While select( ) performs a similar function no matter what type of data structure it is called on, the details of the select( ) implementation for different data structures may vary in different operating systems as described more fully below.

A good description of the select( ) system call and sockets can be found in the reference book *UNIX Network Programming*, by Richard Stevens, (section 6.13), Prentice Hall, 1990.

Background of Distributed Memory Environments

Figure 1:
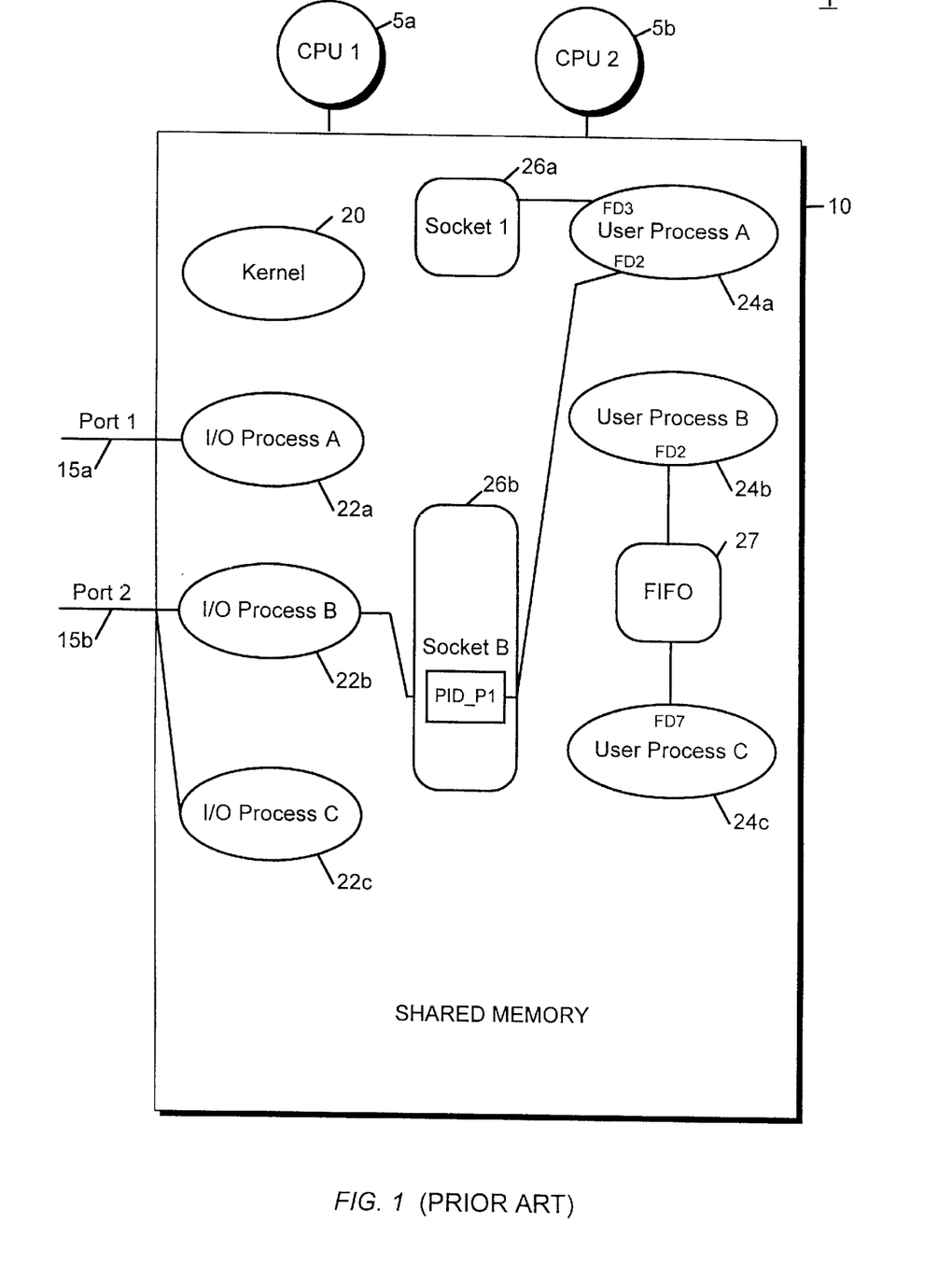
FIG. 1 is a block diagram illustrating a computing environment of the prior art in which a select( ) function may be utilized.

In operating systems that have a single central processing unit (CPU) or multiple CPUs with shared memory, select( ) can be easily implemented because the data structures representing sockets, pipes, or FIFOs in the system are contained in a single memory space, as shown in FIG. 1, and therefore can be directly accessible to every process running in that memory space, including the OS.

However, in non-shared memory distributed systems, such as that discussed in U.S. Pat. No. 4,228,496, select( ) is more difficult to implement because the information regarding the occurrence of different events on different data structures may be contained in a memory different from that which holds the user process calling select and may not be directly accessible even to the OS local to the process that called select.

What is needed is a method for performing a select( ) function effectively in a distributed memory environment.

SUMMARY OF THE INVENTION

Glossary

The following terms are used in this application in accordance with the explanations below and also in accordance with their broad meanings as understood in the art.

Connection—a means for communicating data between processes or between a process and an I/O device, such as a socket, a RAM file, a disk file, a directory, a pipe, a FIFO, a TTY, etc.

Event—an occurrence on a connection, such as a ready-to-read, ready-to-write, or exceptional condition.

File descriptor (FD)—An identifier local to a user process and shared by only that process and related (child) processes for identifying a particular connection opened or created by that process.

I/O process—An input/output process for managing data input and output on some physical resources such as a network. Also called a server process.

Kernel—The executing operating system executable code that manages the activity of all other processes.

Message—In a distributed CPU environment, data communicated between two or more different CPUs or memory spaces over a communications channel.

Operating System (OS)—The kernel and other callable functions and resources available to processes.

Process—a collection (generally a sequence) of executable program code and associated state information that can independently execute and may at any given time be either executing or dormant.

Socket—A data construct residing in a memory that allows one process to communicate data with another process via a standard interface.

User process—A process created to perform a user function. Also called an application.

DESCRIPTION OF THE PREFERRED EMBODIMENT

Select( ) and Sockets in a Single-Memory-Space Computer

FIG. 1 is a block diagram illustrating a computing environment of the prior art. This figure depicts a computer system 1, with multiple CPUs 5a–b, a shared memory space 10, I/O ports 15a–b with I/O processes 22a–c, user processes 24a–c, sockets 26a–b, and FIFO 27.

Processes shown in FIG. 1 include the operating system process 20, also referred to as the kernel, I/O processes 22a–c, and user processes 24a–c.

Kernel 20 is a continually running process that manages the overall operation of the operating system and resource usage by other processes. I/O processes 22a–c are each generally connected to a physical I/O interconnection such as a network connection, disk drive, or video display, and manage data communications between the physical device and other processes in the system. User processes 24a–c are user-invoked executable code that perform user functions.

Sockets 26a–b and FIFO 27 are data structures residing in the shared memory space that are created by a process or the kernel to facilitate interprocess communication.

As shown in FIG. 1, SOCKET_B is connected between I/O process 22b and user process 24a. With SOCKET_B connected as such, data intended for USER_PROCESS_A can be received by I/O_PROCESS_B and stored at the memory location pointed to by SOCKET_B even when USER_PROCESS_A is not available. Whenever USER_PROCESS_A becomes available, or is awakened by the kernel, it can read the data from SOCKET_B, without interrupting whatever new action I/O_PROCESS_B is undertaking. SOCKET_B is generally constructed so that it can receive and store a large number of data packets until a user process that wants data from the socket performs a read on that socket. For each read preformed, SOCKET_B delivers and then discards the next packet of data in the order it was received from I/O_PROCESS_B.

Select( )

A process such as USER_PROCESS_A may call select( ) on SOCKET_B when it wants to access SOCKET_B, but it is not sure that SOCKET_B is ready for the type of operation desired. The select( ) call alerts OS kernel 20 that USER_PROCESS_A wishes to be awakened when SOCKET_B is ready to perform the requested operation.

Stated more generally, a process may call a select( )-type function when it is waiting for one or more events to occur on one or more connections. A process may go dormant after calling select( ) if the event does not happen immediately. In one specific implementation of select( ), as called on sockets, there are three types of events: (1) a socket is ready to have data read from it, (2) a socket is ready to have data written to it, and (3) an exceptional condition relating to a socket is pending. Generally, exceptional conditions are defined only for sockets, while read/write readiness is defined for most connections.

In a specific example, the process calling select( ) provides the following parameters to OS kernel 20:

Bitmask for read;
Bitmask for write;
Bitmask for exception (for sockets);
Size of bitmask (number of bits);
Timeout; and
A variable for the select( ) return value.

Bits set in a bitmask identify the connections in which the calling process is interested for that operation. If no connections of interest are ready, then the process is suspended until one of the connections becomes ready or the timeout expires. The select( ) system call returns a count of how many requested connections are ready (this value can be 0 if the timeout expires) and updates the bitmasks—if a bit was set and the corresponding connection is not ready, then that bit is cleared to 0; if a bit was set and the corresponding connection is ready, then the bit is left set to 1.

File Descriptors (FD's)

In general, in UNIX and similar systems, information regarding connections requested by a user process are communicated between the user process and the OS using File Descriptors (FD's). FD's are generally integer identifiers that are assigned when a user process executes a particular system call to establish a connection, such as open( ) (on existing disk files, directories, etc.), socket( ), pipe( ), etc. FD's, once returned, are used for subsequent system calls like read( ), write( ), close( ), or select( ) to identify the connection on which to perform the operation, and are used in bitmasks as described above. FD's in general are local to the process that requested them, but may also be inherited by child processes and in some cases may be passed to other processes. OS 20 maintains a data structure regarding information about each process, the FD's defined for that process and the connections indicated by those FD's.

Use of shared memory space for interprocess communication

In the shared memory system shown in FIG. 1, interprocess communication takes place through the mechanism of the shared memory and is managed by OS 20. If OS 20 or any other authorized process wishes to know the status of any one of the sockets 26a–b or of any other connection resource, it simply reads the shared memory space where those sockets reside and thereby acquires the relevant data.

Overview of Distributed Memory Space Implementations

Figure 2:
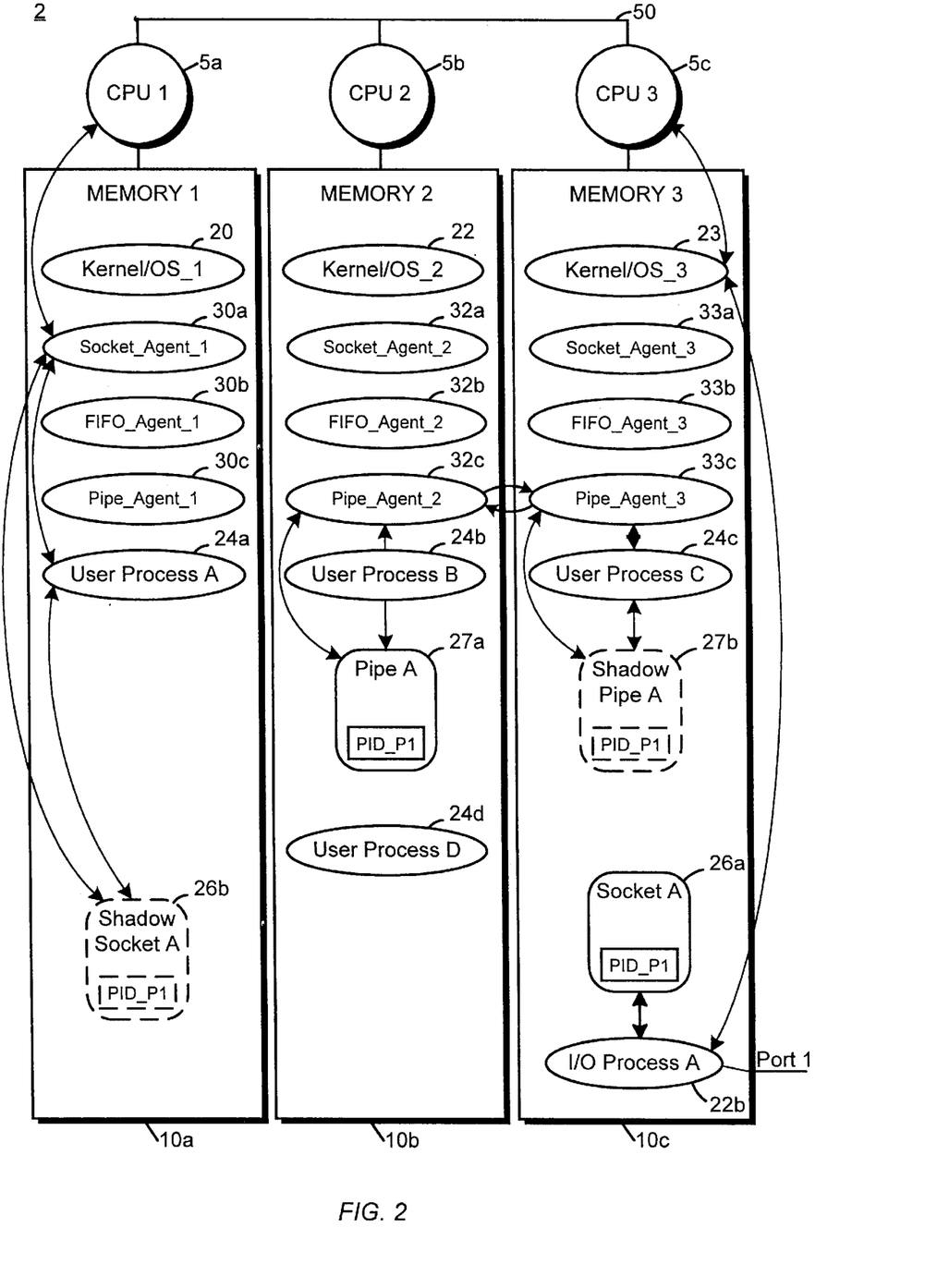
FIG. 2 is a block diagram illustrating a distributed computing environment embodying the invention.

FIG. 2 is a block diagram illustrating a computing environment 2 in which a distributed select( ) and other interprocess communication functions may be advantageously utilized according to the present invention. As in FIG. 1, this computer environment may include multiple CPUs 5a–c, I/O ports such as PORT_1, user processes 24a–d, sockets such as 26a, and pipes or FIFOs such as 27a.

Computing environment 2 differs from 1 in that environment 2 is distributed onto a number of nonshared memory spaces 10a–c, with each memory space generally having its own OS kernel 20, 22, or 23. Data structures, including resources for interprocess communication, residing in one memory space are not directly accessible to processes in a different memory space. For purposes of this discussion, data structures, processes, and CPUs will be referred to as local to one another if they are directly associated with the same memory space and will be referred to as remote to processes or CPUs connected with other memory spaces.

According to the present invention, a user process such as USER_PROCESS_A is not necessarily aware that it is running in a distributed memory environment; however, the invention allows USER_PROCESS_A to establish an interprocess connection with any other process in the environment as though, from USER_PROCESS_A's perspective, all processes were running in the same memory space.

According to the invention, a user process, such as USER_PROCESS_A, may in addition call a select( ) type function on opened interprocess connections even when those connections are not local to the calling process.

Computer environment 2 includes a number of mechanisms that allow this, including communication channel 50 allowing CPUs 5a–c to communicate data to each other. One mechanism for this CPU to CPU communication is a messaging system, such as the Guardian messaging system described in U.S. Pat. No. 4,228,496.

According to the present invention, computer environment 2 also includes a number of agent processes in order to facilitate interprocess communications and implement a distributed select( ) function. These agent processes, such as 30a–c, 32a–c, 33a–c, are created by each OS in order to manage connections over the distributed environment as described below.

Establishing a Remote Interprocess Connection

Figure 4:
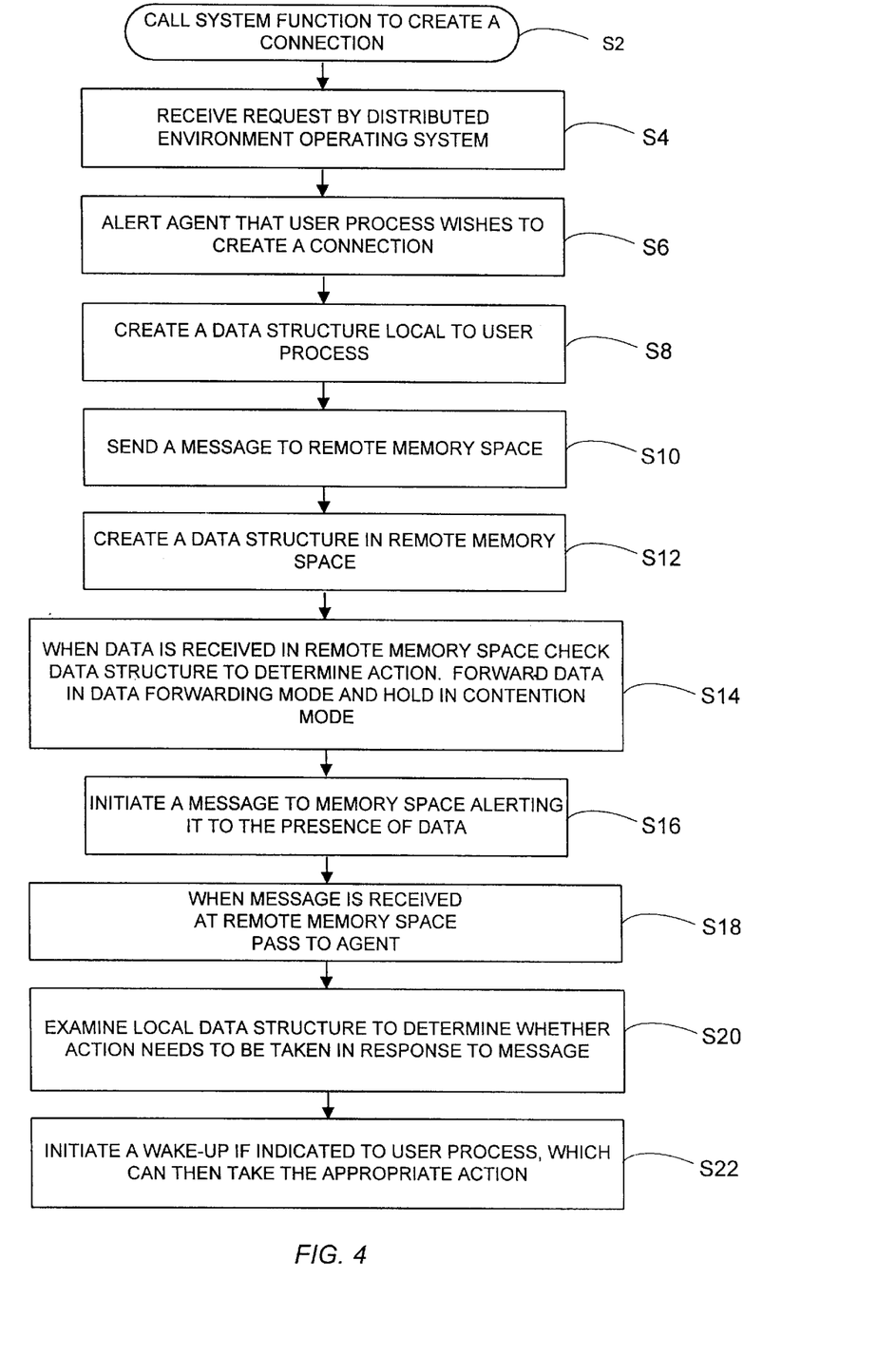
FIG. 4 is a flow chart of a method of creating an interprocess connection according to the invention.

The present invention may be further understood by considering the method, as illustrated by FIGS. 2 and 4, by which a connection between two processes is established in a distributed memory environment in accordance with the present invention. For the purposes of this example, assume that USER_PROCESS_A in memory space 10a wishes to establish a connection with I/O_PROCESS_A residing in a remote memory space 10c. USER_PROCESS_A is not necessarily aware that it is running in a distributed memory environment.

According to the present invention, the interprocess connection would be created as follows: USER_PROCESS_A calls a system function to create the connection to I/O_PROCESS_A (Step S2). In one specific embodiment, this system function might be a sockets call.

The system function call is received by the memory space 10a operating system, which is specifically designed to operate over a distributed environment (Step S4). The operating system alerts SOCKET_AGENT_1 that USER_PROCESS_A wishes to create a socket with I/O_PROCESS_A (Step S6). SOCKET_AGENT_1 creates a SHADOW_SOCKET_A local to USER_PROCESS_A (Step S8). Once created, this SHADOW_SOCKET_A, from USER_PROCESS_A's perspective, behaves just as a socket would in a nondistributed memory environment.

SOCKET_AGENT_1 then sends a message to the remote memory space loc via CPU_1 and the CPU bus 50 (Step S10). When this message is received at the remote memory space by I/O_PROCESS-A, I/O_PROCESS_A creates the real SOCKET_A in its memory space for holding connection information and storing data received on PORT_1 (Step S12). Whenever I/O data is received by I/O_PROCESS_A, I/O_PROCESS_A checks SOCKET_A to determine what to do with that data (Step S14).

If SOCKET A indicates that USER_PROCESS_A is the destination for that data, I/O_PROCESS_A or kernel 23 initiates a message again through the CPU to the memory space 10a alerting the memory space 10a processes to the presence of the data in SOCKET_A (Step S16). According to one embodiment of the invention, I/O_PROCESS_A, like SOCKET_AGENT_1, is a process that is always running and is specifically aware it is in a distributed environment. According to one embodiment of the invention, one mode is defined wherein the data is immediately transmitted from SOCKET_A to SHADOW_SOCKET_A and is stored there until it is read by USER_PROCESS_A, and an alternative mode is defined where data is held at SOCKET A until a read request is received from USER_PROCESS_A.

When a message is received at memory space 10a, it is passed to SOCKET_AGENT_1, which is always running (Step S18). SOCKET_AGENT_1 then examines SHADOW_SOCKET_A to determine whether action needs to be taken in response to the message from I/O_PROCESS A (Step S20). If SOCKET_AGENT_1 determines that USER PROCESS A is waiting to receive data, SOCKET_AGENT_1 can initiate a wake-up to USER_PROCESS_A, which can then take the appropriate action (Step S22).

Distributed Select( )

Figure 5:
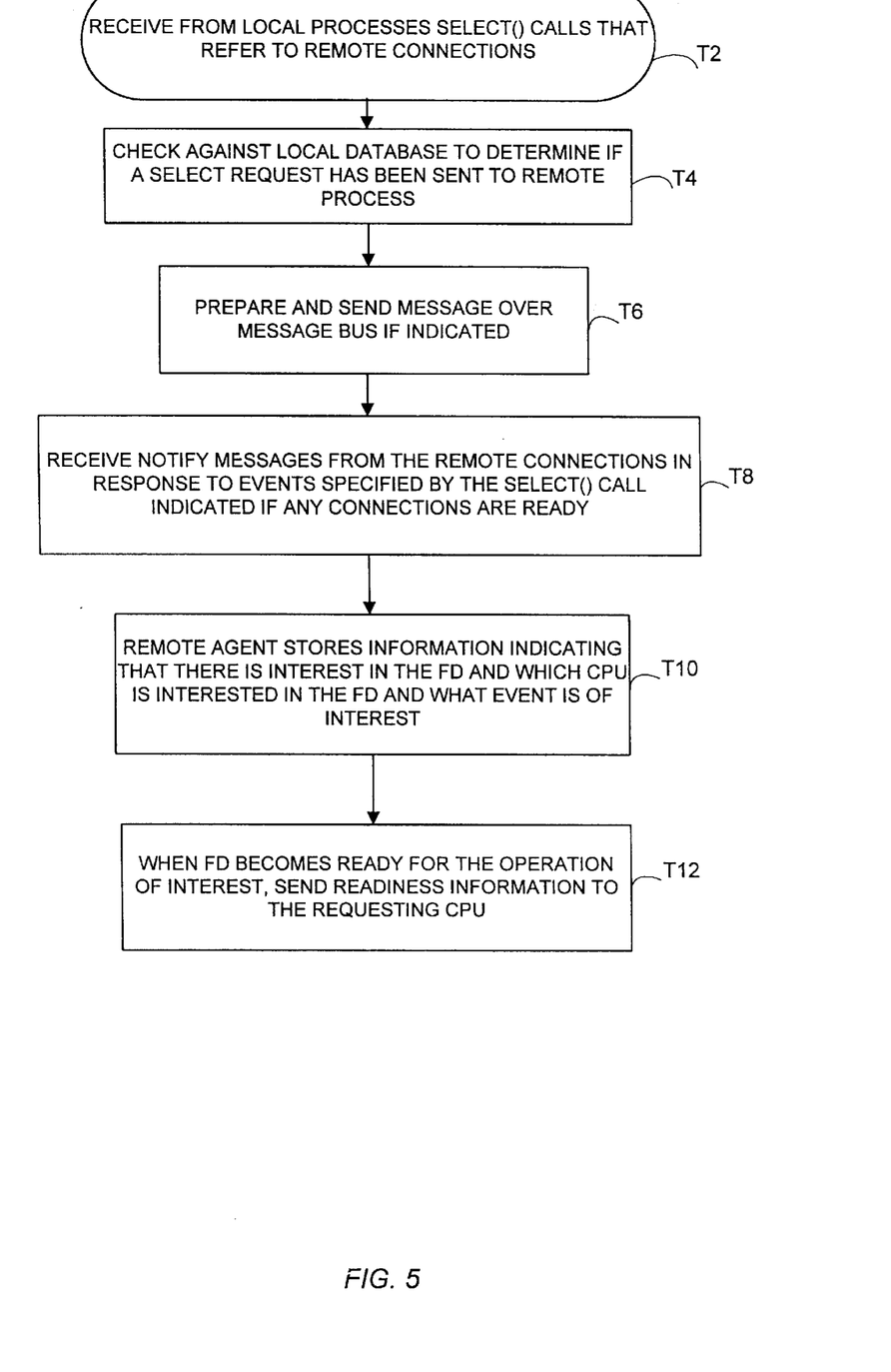
FIG. 5 is a flow chart of a method of accomplishing a distributed select according to the invention.

The present invention further enhances a distributed memory space environment by providing a means for implementing a select( ) system function in that environment. According to the present invention, agents such as 30a–c perform a number of key functions in implementing a distributed select( ), as illustrated in FIG. 5.

According to one embodiment of the invention, an agent is passed, by its local OS, all select( ) calls from any local processes that refer to remote connections (Step T2). The agent prepares messages to the remote connections which are transmitted over message bus 50 (Step T6). The agent process receives all notify messages from the remote connections in response to events specified by the distributed select( ) call (Step T8).

The remote process or the agent managing the remote connection keeps track of which interprocess resources (or FDs) are of interest to a given user process, and which operations are of interest for a given resource, and which CPUs are interested in a given resource/operation.

When an I/O process or a remote agent receives a request for a notify via a select( ) or other call when a particular FD is ready, if the FD is not ready, the I/O process or remote agent stores information indicating that there is interest in the FD and which CPU is interested in the FD and what event is of interest (Step T10). If the FD becomes ready for the operation of interest, the I/O process sends readiness information to the requesting CPU (Step T12).

Although, logically speaking, the calling process (or OS kernel on behalf of the calling process) sends the message to the remote process expressing interest in a given FD, according to the invention the response from the remote process is not necessarily returned to the calling process because the calling process may have terminated or may timeout on select( ) then exit normally. The present invention solves this problem by having all responses to select( ) returned to an agent process. The agent processes are always available to receive responses and to take the appropriate action.

The agent process acts as a middleman between local processes calling select( ) and remote processes. An agent acquires the select( ) messages built by an OS kernel and sends them to the remote process. An agent receives select( ) readiness messages from the remote process. An agent posts the information from the messages to data structures such as sockets, adds FDs to the calling process' linked list of ready FDs, and wakes the calling process when a selected FD becomes ready.

Figure 3:
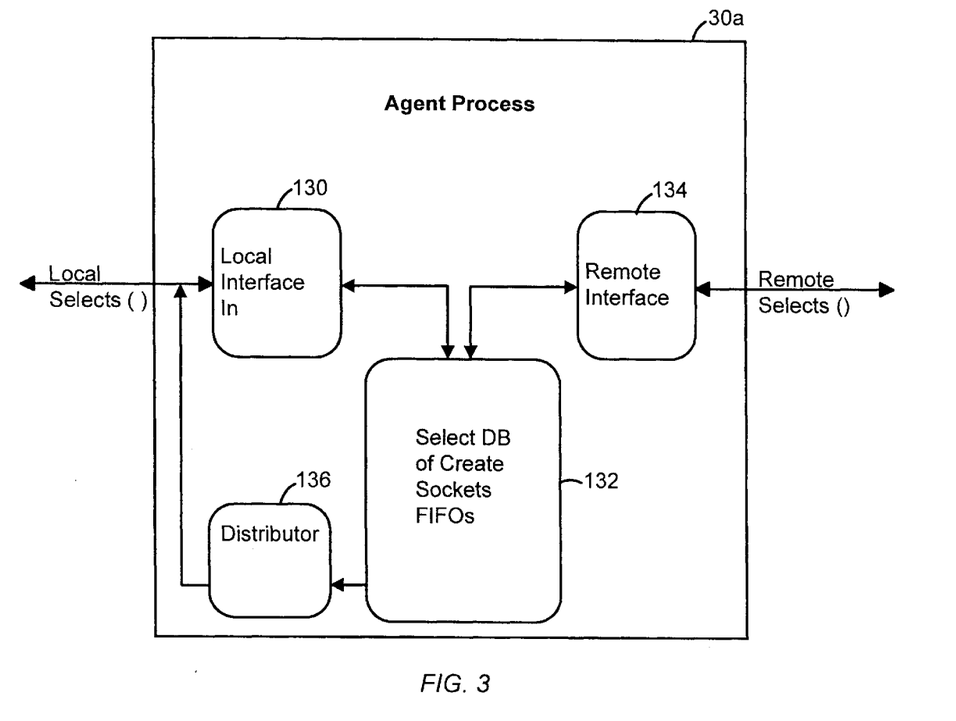
FIG. 3 is a block diagram illustrating an agent in accordance with the invention.

FIG. 3 shows a block diagram of an agent process as an example of an embodiment of the present invention. According to the present invention, an agent process includes a local interface for interacting with the local operating system and local processes. According to one embodiment of the invention, this local interface 130 receives all select( ) calls from local processes, even those which do not require any remote access. According to the present invention, when an agent determines from its select data base that a particular connection operation requires notification of a remote process, and that remote process has not already been notified, the CPU upon which the process is running desires notification of that particular connection event, agent process 30a sends a message via a remote interface 134 to a remote process running in a remote memory space.

Once agent process 30a receives any responses to requests it has sent to remote processes, it passes those responses to a distributor 136, which determines which local processes need to be notified of the response and what action, such as waking up a local process, needs to be taken. Distributor 136 then uses a local interface to communicate such responses and take appropriate action.

Another aspect of the current invention is that, in order to maintain consistency between socket function calls, the present invention may employ a separate shadow socket and real socket and use of a socket agent to communicate between a user process and an I/O process even when the user process and the I/O process reside within the same memory space.

In one specific embodiment of an environment incorporating the invention, there are as many as three agent processes in each distributed memory space, one handling sockets, one handling pipes, and one handling FIFOs. Alternative embodiments could employ one agent process, or more than one, to handle different interprocess communication resources. For example, one agent process could handle pipes and FIFOS and a different agent process could handle sockets.

OS Kernel Code Functions in Distributed Select()

In one specific embodiment of the present invention, OS kernel code performs several functions to implement the distributed select( ). The kernel accepts and validates input parameters from processes calling select( ) and gathers and formats return parameter information. It marks kernel data structures to provide information needed by the local agent process. And it builds the select( ) messages which are sent to remote processes.

The OS kernel in one embodiment invokes the system call "WAIT" to suspend the select( ) calling process. The calling process is awakened by the agent if an FD becomes ready, or by the OS kernel if select( ) times out or is interrupted by a signal. If the calling process is awakened due to an FD becoming ready, it still needs to learn which FD of interest is ready and for which operation (read/write/exception). One optimization of the present invention is to provide the agent with the location of a linked list of data structures containing information regarding ready FDs. When a calling process is awakened, the OS kernel (on behalf of the calling process) will peruse this list to learn which FDs are ready. The kernel checks whether these FDs are ones the calling process is interested in. If so, the kernel updates the calling-process-provided bitmaps and returns control to the calling process. If not, the kernel suspends the calling process again and waits for FDs of interest to become ready.

Reducing Messages Between CPUs

A benefit of the present invention concerns how multiple instances of the same connection or FD existing on the local CPU are handled. As is known in the art, a calling process may fork( ) and create child processes which inherit the parent's open FDs, or the calling process may call dup( ) and obtain multiple FDs which refer to the same connection. In either of these cases, it is possible that select may be called such that interest is indicated for the same FD multiple times. Both parent and child may call select( ) on an FD independently, or a single process may call select( ) using multiple FDs that refer to the same open. In order to reduce message bandwidth on bus 50 and improve system performance, it is desirable to send only a single select( ) message to the remote process indicating that a particular FD and event on that FD are of interest.

According to the invention, when a second select( ) request comes into the local OS kernel, that select is passed to the local agent process which checks against a database it maintains to determine that the remote process has already been contacted regarding that FD and therefore there is no need to send another message to the remote process (Step T6). However, the agent process records that this second select( ) call was made so that when the remote process sends a response indicating that the FD has become ready, the response is distributed to all calling processes that called select( ) and/or to multiple duplicate FDs in the same process. Not sending unnecessary duplicate select( ) requests to the remote process saves duplicate messages on bus 50 on both the transmit and receive end of the select.

Fault Tolerance

The present invention provides a mechanism for increased fault tolerance of select( ) functions and interprocess communication in a distributed memory environment such as shown in FIG. 2. According to this aspect of the invention, an agent process will, from time to time, check to see if remote processes to which it is maintaining connection information are still active in a remote CPU. If a remote process terminates unexpectedly, the local agent will become aware of this and will inform local processes that may be paused or asleep, waiting for action by the remote process to awaken and to take appropriate action. According to this aspect of the invention, the distributed memory system as shown in FIG. 2 is fault-tolerant in that one entire memory space and its associated CPU can fail, and the overall environment will continue to function and recover from the failure of one piece.

Scalability

The present invention also provides a means for increased scalability in a distributed memory system such as that shown in FIG. 2. According to this aspect of the invention, any number of additional memory spaces with CPUs may be added to an integrated system, each separate space having its own set of agent processes to handle socket, FIFO, and pipe connections. The invention will work much the same way regardless of the number of additional memory space environments that are added to the system.

Variations of Implementation for FIFOs and Pipes

According to the present invention, interprocess communications may be handled identically for different types of interprocess connections such as sockets, pipes, or FIFO.

However, the invention also allows for variations in the handling of different types of interprocess connections in order to optimize performance.

As shown in FIG. 2, a separate agent process may be created in each memory space for sockets, FIFOs, and pipes. According to an embodiment of the invention, a pipe agent such as 32c may operate similarly to the socket agent previously described, with the difference being that, for a pipe connection, the pipe agent such as 32c communicates with a remote pipe agent such as 33c rather than communicating with a remote I/O process. In this case, the remote pipe agent 33c may create a shadow pipe 27b to communicate data locally with the USER_PROCESS_C. Pipe agent communications such as those between 32c and 33c take over the CPU system bus 50 as for sockets. Such agent to agent communications are not necessary for socket communication, because in the case of sockets, there is always a continuously running remote I/O process that can create the remote real socket and can send a receive messages on the remote end. FIFOs and pipes are not automatically associated with such a continuously running process, and so agent to agent communication is used.

However, the essential operation of the invention for sockets, pipes, and FIFOs is similar. In each case, an operating system according to the invention facilitates interprocess communications and the select function by providing a continuously running process at both ends of a remote interprocess connection. In the case of sockets, on one end this continuously running process is the socket agent and on the other end it is the I/O process itself. The I/O process, like the agents, is specifically designed to operate in the distributed environment and is able to send and receive messages directed to the remote memory spaces.

It should be further understood that according to the present invention, a distributed select function may also be used with other types of files, including directories and disk files. These two file types are always ready for reading and writing and never ready for exceptions, so the implementation of select( ) for these files, even in a distributed environment, is trivial in that once select( ) determines the file type, the status is known.

Variations of Implementation for TTYs

According to another embodiment, a TTY file, also called the character file, has select implemented in the same way as select is called on sockets. According to the invention, TTY select( ), similar to socket select( ), relies on a central I/O process to keep the controlling data structures. However, in the case of TTY, I/O process A 22b would be a Telnet server, and is responsible for maintaining the state of the data structures that hold the state of the open TTY connections. The Telnet server is also responsible for communicating with a TTY agent process in each CPU to give back the status to the select( ), and the agent process in each CPU wakes up processes waiting for TTY select indications.

Contention Mode and Data Forwarding Mode

The present invention, in one embodiment, may provide for two different modes by which data received by an I/O process such as 22b is transmitted to a remote memory space.

The normal case is data forwarding mode in which, as soon as data is received by process 22b, process 22b examines the port address of the data and looks up the ultimate address of the data in SOCKET_A. From 26a, process 22b determines that the data is destined for process 24a on memory 10a. Process 22b then composes a message to SOCKET_AGENT_1, including the packet data, and sends the message over bus 50. When the message is received by SOCKET_AGENT_1, SOCKET_AGENT_1 places the packet data in the memory location specified by SHADOW_SOCKET_A, and then wakes up user process 24a as appropriate.

The invention also may provide a contention mode forwarding strategy. I/O process 22b operates in contention mode when it determines that user processes in more than one memory space are interested in reading data from a particular socket. In that case, packet data cannot be forwarded to a shadow socket, because I/O process 22b does not know what process will next do a read on the data. In contention mode, the packet data is then stored at SOCKET_A, and a message indicating that data is ready is sent over bus 50. When a read( ) is invoked by a local process such as 26b, that read is forwarded by the OS to the local socket agent, which then sends a message over bus 50 to process 22b to deliver a packet of data. In this way, the sockets protocol of always delivering the next available packet to the next read request is preserved.

Invention on Computer Readable Media

Figure 6:
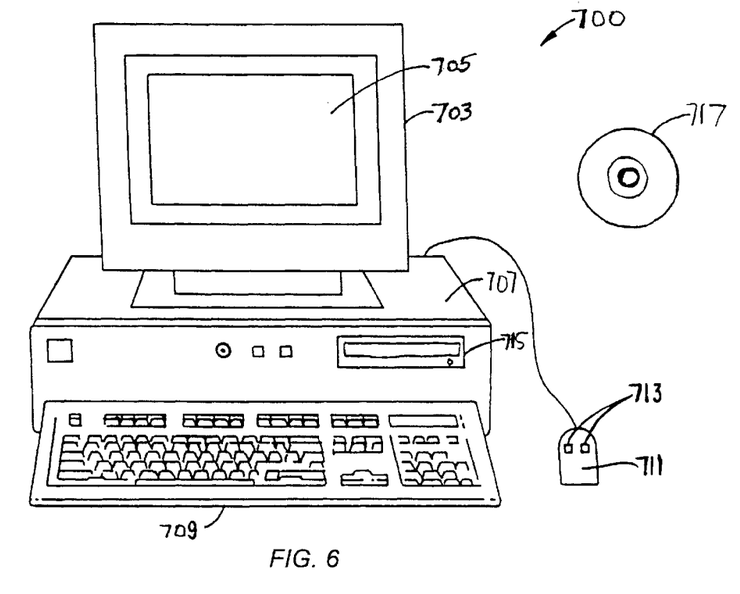
FIG. 6 is a block diagram illustrating a generalized computing system upon which the present invention may be implemented.

FIG. 6 illustrates an example of a computer system that may be used to execute software embodying aspects of the present invention. FIG. 6 shows a computer system 700 which includes a monitor 703, screen 705, cabinet 707, keyboard 709, and mouse 711. Mouse 711 may have one or more buttons such as mouse buttons 713. Cabinet 707 is shown housing a disk drive 715 for reading a CD-ROM or other type disk 717. Cabinet 707 also houses the multiple computer processors and memory spaces as shown in FIG. 2. According to one embodiment of the invention, the invention may be incorporated into operating system software or system utility software recorded onto a medium such as disk 717 which, when loaded into an appropriate computer system causes the system to perform the described method.

The present invention has been described with reference to specific embodiments, but other embodiments will be obvious to persons of skill in the art. In particular, method steps are grouped functionally for the purposes of understanding the invention. It will be understood by those of skill in the art, however, that various method steps could be performed in different orders or could be placed in different functional groupings without changing the essential nature of the invention. The invention, therefore, should not be limited except as provided in the attached claims.

What is claimed is:

1. A process for establishing interprocess communication in a distributed computing environment including a plurality of processing units each having an associated, non-shared memory space, the communication to be established between a user process executed by a first processing unit and residing in a first memory space and an input/output (I/O) process executed by a second processing unit and residing in a second memory space, the first and second processing units being communicatively coupled via a communication channel, the process comprising the steps of:

the user process calling a system function for requesting a connection with the I/O process and for requesting notification of occurrence of one or more event at the second memory space, wherein the user process may become dormant if the requested connection is not immediately ready;

creating an agent residing in the first memory space, said agent being responsive to the system function call, and operative to initiate creation of a first data structure to reside in the first memory space, the first data structure for facilitating access to associated data for the purpose of interprocess communication, said agent also being operative to store within said first memory space outstanding request information indicating events for which requested notifications are outstanding;

creating a second data structure residing in the second memory space, said second data structure for facilitating access to associated data for the purpose of interprocess communication;

said agent being further operative to perform the steps of, receiving a new request for notification of a specified event, comparing said new request for notification of a specified event against said outstanding request information, determining whether a request for notification of said specified event is outstanding, and if no request for notification of said specified event is outstanding, sending a request message to the I/O process via the communication channel for the purpose of requesting notification of the occurrence of said specified event, whereby the number of messages transmitted via the communication channel is reduced by not sending duplicate requests for notification to the I/O process;

said agent receiving a notification message indicative of the occurrence of the specified event from said second memory space, said agent being further operative to communicate the received notification to said user process, and to wake up said user process if said user process is currently dormant.

2. The method according to claim 1 wherein said requests for notification are generated by a select( ) function.

3. The method according to claim 1 wherein said user process operates as if said user process and said I/O process were both operating in a shared memory space environment.

4. The method according to claim 1 wherein said requests for notification are received by a process residing in said second memory space.

5. The method according to claim 4 wherein said process residing in said second memory space is a second agent.

6. The method according to claim 4 wherein said I/O process residing in said second memory space is a continuously running I/O process.

7. The method according to claim 6 wherein said continuously running process residing in said second memory space is specifically designed for a distributed environment.

8. The method according to claim 1 wherein said first data structure is a shadow socket operating in the first memory space according to a standardized protocol, and wherein said second data structure is a socket operating in the second memory space according to a standardized protocol.

9. The method according to claim 8 wherein data received at said socket is forwarded to said shadow socket and stored at a location of the first memory space indicated by said shadow socket until read by said user process at said first memory space.

10. The method according to claim 9 wherein said socket operates according to two modes including a data forwarding mode wherein data is immediately forwarded to said shadow socket, and a contention mode wherein data is held at said socket until a read request is received at said socket.

11. A fixed computer readable medium containing computer executable program code, which, when loaded into an appropriately configured computer system will cause the computer to perform the method of claim 10.

12. The method according to claim 1 wherein said first data structure is a pipe operating in the first memory space according to a standardized protocol, and said second data structure is a shadow pipe operating in the second memory space according to a standardized protocol.

13. The method according to claim 1 wherein said first data structure is a FIFO operating in the first memory space according to a standardized protocol, and said second data structure is a shadow FIFO operating in the second memory space according to a standardized protocol.

14. A fixed computer readable medium containing computer executable program code, which, when loaded into an appropriately configured computer system will cause the computer to perform the method of claim 1.

15. The method according to claim 1 wherein said outstanding requests and said new requests are generated by the same process.

16. The method according to claim 1 wherein said outstanding requests and said new requests are generated by two different processes.

17. A distributed computing environment as recited in claim 1 wherein said communication channel comprises a bus.

18. A method as recited in claim 1 wherein said agent is further operative to perform the steps of:

if a request for notification of said specified event is outstanding, suppressing transmission of a message associated with said new request.

19. A method as recited in claim 1 wherein said new request for notification of said specified event is received from a second user process, and wherein said agent is further operative to perform the steps of:

if a request for notification of said specified event is outstanding, recording information associated with said new request and said second user process, suppressing transmission of a message associated with said new request, and upon receiving said notification message indicative of the occurrence of said specified event, communicating the received notification to said second user process.

20. A distributed operating system incorporating a distributed select function for establishing interprocess communication in a distributed computing environment including a plurality of processing units each having an associated non-shared memory space, the communication to be established between a user process executed by a first processing unit and residing in a first memory space and an input/output (I/O) process executed by a second processing unit and residing in a second memory space, the first and second processing units being communicatively coupled via a communication channel, the operating system comprising:

a user process residing in a first memory space and being operative to call a system function for requesting a connection with an I/O process residing in a second memory space, and for requesting notification of occurrence of one or more events at the second memory space, wherein the user process may become dormant if the requested connection is not immediately ready;

a first agent residing in the first memory space, said first agent being responsive to system function calls, and being operative to store with said first memory space outstanding request information indicating events for which requested notifications are outstanding;

a first data structure residing in the first memory space for facilitating access to associated data for the purpose of interprocess communication;

a second agent running in the second memory space;

a second data structure residing in the second memory space for facilitating access to associated data for the purpose of interprocess communication; and said first agent being further operative to compare a new request for notification of a specified event against said outstanding request information, to determine whether a request for notification of said specified event is outstanding, and if no request for notification of said specified event is outstanding, to send a request message to the remote I/O process via the communication channel for the purpose of requesting notification of the occurrence of the specified event, whereby the number of messages transmitted via the communication channel is reduced by not sending duplicate requests for notification to the I/O process;

said first agent being further responsive to a notification message indicative of the occurrence of the specified event, and further operative to communicate the received notification to said user process, and to wake up said user process if said user process is currently dormant.

21. A distributed operating system as recited in claim 20 wherein said first data structure is a shadow socket operating in the first memory space according to a standardized protocol, and wherein said second data structure is a socket operating in the second memory space according to a standardized protocol.

22. A distributed operating system as recited in claim 21 wherein data received at said socket is forwarded to said shadow socket and stored at a location of the first memory space indicated by said shadow socket until read by said user process at the first memory space.

23. A distributed operating system as recited in claim 22 wherein said socket operates according to two modes including a data forwarding mode wherein data is immediately forwarded to said shadow socket, and a contention mode wherein data is held at said socket until a read request is received at said socket.

24. A distributed operating system as recited in claim 20 wherein said first data structure is a pipe operating in the first memory space according to a standardized protocol, and said second data structure is a shadow pipe operating in the second memory space according to a standardized protocol.

25. A distributed operating system as recited in claim 20 wherein said first data structure is a FIFO operating in the first memory space according to a standardized protocol, and said second data structure is a shadow FIFO operating in the second memory space according to a standardized protocol.

26. A distributed operating system as recited in claim 20 wherein said first agent is further operative to suppress transmission of a message associated with said new request if a request for notification of said specified event is currently outstanding.

27. A distributed operating system as recited in claim 20 wherein said new request for notification of said specified event is received from a second user process, and wherein said agent is further operative to perform the steps of:

if a request for notification of said specified event is outstanding,
recording information associated with said new request and said second user process,
suppressing transmission of a message associated with said new request, and
upon receiving said notification message indicative of the occurrence of said specified event, communicating the received notification to said second user process.

28. A distributed computing environment comprising:

a first processing unit having a first memory space associated therewith;

a second processing unit having a second memory space associated therewith;

a communication channel for communicating messages between said first and second processing units;

a user process residing in the first memory space and being operative to request notification of occurrence of one or more events at the second memory space;

an I/O process residing in the second memory space;

said user process being operative to call a system function for requesting a connection with said I/O process, wherein the user process may become dormant if the requested connection is not immediately ready;

a first data structure residing in the first memory space for facilitating access to associated data for the purpose of interprocess communication;

a second data structure residing in the second memory space for facilitating access to associated data for the purpose of interprocess communication;

a first agent residing in the fist memory space, said fist agent being responsive to the system function call, and operative to store within said first memory space outstanding request information indicating events for which requested notifications are outstanding, to compare a new request for notification of a specified event against said outstanding request information, to determine whether a request for notification of said specified event is outstanding, and if no request for notification of said specified event is outstanding to send a request message to the I/O process via the communication channel for the purpose of requesting notification of the occurrence of said specified event, whereby the number of messages transmitted via the communication channel is reduced by not sending duplicate requests for notification to the I/O process;

a second agent running in said second memory space;

wherein said first agent is responsive to a notification message indicative of the occurrence of the specified event, and further operative to communicate the received notification to said user process, and to wake up said user process if said user process is currently dormant.

29. A distributed computing environment as recited in claim 28 wherein said first data structure is a shadow socket operating in the first memory space according to a standardized protocol, and wherein said second data structure is a socket operating in the second memory space according to a standardized protocol.

30. A distributed computing environment as recited in claim 29 wherein data received at said socket is forwarded to said shadow socket and stored at a location of the first memory space indicated by said shadow socket until read by said user process at said first memory space.

31. A distributed computing environment as recited in claim 30 wherein said socket operates according to two modes including a data forwarding mode wherein data is immediately forwarded to said shadow socket, and a contention mode wherein data is held at said socket until a read request is received at said socket.

32. A distributed computing environment as recited in claim 28 wherein said first data structure is a pipe operating in the first memory space according to a standardized protocol, and said second data structure is a shadow pipe operating in the second memory space according to a standardized protocol.

33. A distributed computing environment as recited in claim 28 wherein said first data structure is a FIFO operating in the first memory space according to a standardized protocol, and said second data structure is a shadow FIFO operating in the second memory space according to a standardized protocol.

34. A distributed computing environment as recited in claim 28 wherein said first agent is further operative to suppress transmission of a message associated with said new request if a request for notification of said specified event is currently outstanding.

35. A distributed computing environment as recited in claim 28 wherein said new request for notification of said specified event is received from a second user process, and wherein said agent is further operative to perform the steps of:

if a request for notification of said specified event is outstanding,
recording information associated with said new request and said second user process,
suppressing transmission of a message associated with said new request, and
upon receiving said notification message indicative of the occurrence of said specified event, communicating the received notification to said second user process.

* * * * *